United States Patent
Fan et al.

(10) Patent No.: US 11,526,969 B2
(45) Date of Patent: *Dec. 13, 2022

(54) MULTI-SPECTRUM-BASED IMAGE FUSION APPARATUS AND METHOD, AND IMAGE SENSOR

(71) Applicant: HANGZHOU HIKVISION DIGITAL TECHNOLOGY CO., LTD., Hangzhou (CN)

(72) Inventors: Meng Fan, Hangzhou (CN); Hai Yu, Hangzhou (CN); Shiliang Pu, Hangzhou (CN)

(73) Assignee: HANGZHOU HIKIVISION DIGITAL TECHNOLOGY CO., LTD., Hangzhou (CN)

( * ) Notice: Subject to any disclaimer, the term of this patent is extended or adjusted under 35 U.S.C. 154(b) by 671 days.

This patent is subject to a terminal disclaimer.

(21) Appl. No.: 16/480,270

(22) PCT Filed: Jan. 25, 2018

(86) PCT No.: PCT/CN2018/074098
§ 371 (c)(1),
(2) Date: Jul. 23, 2019

(87) PCT Pub. No.: WO2018/145576
PCT Pub. Date: Aug. 16, 2018

(65) Prior Publication Data
US 2019/0378257 A1 Dec. 12, 2019

(30) Foreign Application Priority Data
Feb. 10, 2017 (CN) .......................... 201710074101.7

(51) Int. Cl.
*H04N 5/335* (2011.01)
*H04N 9/04* (2006.01)
(Continued)

(52) U.S. Cl.
CPC ............ *G06T 5/50* (2013.01); *H04N 5/2256* (2013.01); *H04N 5/2352* (2013.01);
(Continued)

(58) Field of Classification Search
CPC .. H04N 5/2256; H04N 5/2352; H04N 5/2353; H04N 5/2351; H04N 5/2355;
(Continued)

(56) References Cited

U.S. PATENT DOCUMENTS 11,049,232 B2 * 6/2021 Fan .................... H04N 9/04553
11,057,592 B2 * 7/2021 Pu .......................... G06T 3/4015
(Continued)

FOREIGN PATENT DOCUMENTS

| CN | 102447826 | 5/2012 |
|---|---|---|
| CN | 102687502 | 9/2012 |

(Continued)

OTHER PUBLICATIONS

International Search Report and Written Opinion issued in Corresponding International Patent Application No. PCT/CN2018/074098, dated Apr. 8, 2018.
(Continued)

*Primary Examiner* — Kelly L Jerabek
(74) *Attorney, Agent, or Firm* — Norton Rose Fulbright US LLP

(57) ABSTRACT

A multi-spectrum based image fusion apparatus is disclosed, which includes a light acquisition device, an image processor, and an image sensor having five types of photosensitive channels. The five types of photosensitive channels including red, green and blue RGB channels, an infrared IR channel and a full-band W channel. The light acquisition device acquires target light corresponding to incident light. The image sensor converts the target light into an image signal through the RGB channels, the IR channel and the W
(Continued)

channel. The image processor analyzes the image signal into RGB color signals and a brightness signal, and fuses the RGB color signals and the brightness signal to obtain a fused image. The collection of the channels based on which the RGB color signals and the brightness signal are obtained includes the five types of photosensitive channels.

15 Claims, 4 Drawing Sheets

(51) Int. Cl.
| | |
|---|---|
| *G06T 5/50* | (2006.01) |
| *H04N 5/225* | (2006.01) |
| *H04N 5/235* | (2006.01) |
| *H04N 9/64* | (2006.01) |
| *H04N 9/67* | (2006.01) |
| *H04N 9/78* | (2006.01) |

(52) U.S. Cl.
CPC ............ *H04N 9/045* (2013.01); *H04N 9/646* (2013.01); *H04N 9/67* (2013.01); *H04N 9/78* (2013.01); *G06T 2207/10024* (2013.01); *G06T 2207/10048* (2013.01); *G06T 2207/20221* (2013.01)

(58) Field of Classification Search
CPC .......... H04N 5/332; H04N 5/33; H04N 9/045; H04N 9/646; H04N 9/67; H04N 9/78; H04N 9/04553; H04N 9/04555; H04N 9/04559; G06T 5/50; G06T 2207/10024; G06T 2207/10048; G06T 2207/20221
See application file for complete search history.

(56) References Cited

U.S. PATENT DOCUMENTS

| | | | |
|---|---|---|---|
| 2009/0002475 A1* | 1/2009 | Jelley | H04N 5/33 |
| | | | 348/E7.078 |
| 2009/0285476 A1 | 11/2009 | Choe et al. | |
| 2015/0138366 A1 | 5/2015 | Keelan et al. | |
| 2016/0057367 A1 | 2/2016 | Lee | |
| 2016/0080706 A1 | 3/2016 | Kaiser et al. | |
| 2018/0069996 A1* | 3/2018 | Shukla | H04N 5/2258 |
| 2019/0068929 A1* | 2/2019 | Sato | H04N 5/2354 |

FOREIGN PATENT DOCUMENTS

| | | |
|---|---|---|
| CN | 103971351 | 8/2014 |
| CN | 104683767 | 6/2015 |
| CN | 105210369 | 12/2015 |
| CN | 205092933 | 3/2016 |
| CN | 105704463 | 6/2016 |
| CN | 106385530 | 2/2017 |
| FR | 3030885 | 6/2016 |
| JP | 4695550 | 6/2011 |

OTHER PUBLICATIONS

Office Action issued in Corresponding European Application No. 18751665.3, dated Nov. 6, 2020.
Warzak, Barry. *Dual-band filters target price-sensitive applications*. Vision Systems Design, Nov. 14, 2016, https://www.vision-systems.com/home/article/16736822/dualbandfilters-target-pricesensitive-applications. Accessed Nov. 3, 2020.
Extended European Search Report issued in corresponding European application No. 18751665.3, dated Dec. 9, 2019.
Office Action issued in corresponding Chinese application No. 201710074101.7, dated Nov. 18, 2019.

* cited by examiner

MULTI-SPECTRUM-BASED IMAGE FUSION APPARATUS AND METHOD, AND IMAGE SENSOR

CROSS-REFERENCE TO RELATED APPLICATIONS

The present application is a national phase under 35 U.S.C. § 371 of International Application No. PCT/CN2018/074098, filed Jan. 25, 2018, which claims priority to Chinese patent application No. 201710074101.7 filed with the China National Intellectual Property Administration on Feb. 10, 2017 and entitled "Multi-Spectrum-Based Image Fusion Apparatus and Method, and Image Sensor", each of which are incorporated herein by reference in their entirety.

TECHNICAL FIELD

The present application relates to the technical field of image processing, and in particular, to a multi-spectrum based image fusion apparatus and method, and an image sensor.

BACKGROUND

In low illumination conditions, an image acquisition device with a beam splitting and fusion function is usually required to acquire an image, in order to ensure that the acquired image contains more image information. Specifically, the basic principle for acquisition an image through the image acquisition device with the beam splitting and fusion function is as follows: acquiring a visible light image corresponding to visible light signals and acquisition an infrared image corresponding to infrared light signals, and fusing the visible light image and the infrared image to obtain a fused image. The fused image is a dual-band image, which contains more image information than a single-band image, either the visible light image or the infrared light image.

The image acquisition device with the beam splitting and fusion function specifically includes a transflective mirror, a visible light sensor, an infrared light sensor, a registration unit, and a fusion unit. Specifically, the transflective mirror is used to separate incident light into visible light and infrared light. The visible light sensor is used to acquire visible light to produce a visible light image, and the infrared light sensor is used to acquire infrared light to produce an infrared image. The registration unit is used to eliminate a position deviation between the infrared image and the visible light image. The fusion unit is used to perform weighted fusion on the infrared image and the visible light image the positions of which have been corrected by the registration unit. The resulting fused image obtained by the fusion is an output image of the image acquisition device.

Although the image acquisition device with the beam splitting and fusion function can obtain an fused image, its optical system needs to be specially designed to obtain infrared light and visible light simultaneously, that is, to acquire the infrared light and the visible light simultaneously by a prism beam splitter and different optical sensors. This results in a complex structure of the image acquisition device and limits the scope of its application.

SUMMARY

The objective of embodiments of the present application is to provide a multi-spectrum based image fusion apparatus and method, and an image sensor. The specific technical solutions are as follows:

In a first aspect, an embodiment of the present application provides a multi-spectrum based image fusion apparatus, including:

a light acquisition device, an image processor, and an image sensor having five types of photosensitive channels, the five types of photosensitive channels including red, green and blue RGB channels, an infrared IR channel and a full-band W channel; wherein the light acquisition device is configured to acquire target light corresponding to incident light;

the image sensor is configured to convert the target light into an image signal through the RGB channels, the IR channel and the W channel; and the image processor is configured to analyze the image signal into RGB color signals and a brightness signal, and fuse the RGB color signals and the brightness signal to obtain a fused image, wherein a collection of the channels based on which the RGB color signals and the brightness signal are obtained includes the five types of photosensitive channels.

Optionally, the process that the image processor analyzes the image signal into the RGB color signals and the brightness signal includes:

performing an interpolation operation on the W channel of the image signal to generate a brightness signal that has a resolution same as an input resolution, wherein the input resolution is a resolution of the image signal;

performing interpolation operations on the RGB channels and IR channel of the image signal to generate an image signal of each of the channels that has a resolution same as the input resolution; and traversing the image signal of each of the channels, and subtracting a value of an IR parameter for a pixel position respectively from values of the traversed R channel, G channel, and B channel to generate the RGB color signals, wherein the value of the IR parameter is a product of a value of the IR channel at the pixel position and a preset correction value.

Optionally, the process that the image processor analyzes the image signal into the RGB color signals and the brightness signal includes:

performing interpolation operations on the RGB channels, the IR channel and the W channel of the image signal to generate an image signal of each of the channels that has a resolution same as an input resolution;

generating the brightness signal by using the image signal of each of the channels, a first predetermined formula and a second predetermined formula; wherein the first predetermined formula is $y=x1*R+x2*G+x3*B$, and $x1$, $x2$, and $x3$ are weights, and wherein the second predetermined formula is the brightness signal$=x4*W+x5*IR+x6*y$, and $x4$, $x5$, and $x6$ are weights;

traversing the image signal of each of the channels, and subtracting a value of an IR parameter for a pixel position respectively from values of the traversed R channel, G channel, and B channel to generate first standby RGB color signals, wherein the value of the IR parameter is a product of a value of the IR channel at the pixel position and a preset correction value;

traversing the image signal of each of the channels, and subtracting a value of an IR' for a pixel position respectively from values of the traversed R channel, G channel, and B channel to generate second standby RGB color signals, wherein the value of the IR' for the pixel position is obtained by a third predetermined formula as $IR'=(R+G+B-W)/n$; and weighting and combining the first standby RGB color signals and the second standby RGB color signals to generate the RGB color signals.

Optionally, the process that the image processor fuses the RGB color signals and the brightness signal to obtain the fused image includes:

converting the RGB color signals into YUV signals, wherein the YUV signals are luminance and chrominance signals;

extracting chrominance UV components in the YUV signals;

combining the UV components with the brightness signal to form new YUV signals; and determining the new YUV signals as the fused image, or converting the new YUV signals into RGB signals and determining the resulting RGB signals as the fused image.

Optionally, the process that the image processor fuses the RGB color signals and the brightness signal to obtain the fused image includes:

calculating an auxiliary value Y for each pixel according to the RGB color signals, as $Y=(R*w1+B*w2+G*w3)/(w1+w2+w3)$, wherein R is a value of the R channel corresponding to the pixel, G is a value of the G channel corresponding to the pixel, B is a value of the B channel corresponding to the pixel, and w1, w2 and w3 are weights;

calculating a ratio of the value of each channel of the RGB color signals to the auxiliary value Y to obtain reference channel values K1, K2, and K3 for the pixel, which are calculated as $K1=R/Y$, $K2=G/Y$, $K3=B/Y$;

performing chroma noise reduction on the reference channel values K1, K2, and K3; and fusing the brightness signal Y' with the reference channel values K1-K3 subjected to the chroma noise reduction at the pixel, to generate fused RGB channel values R', G' and B' and obtain the fused image; which are calculated as $R'=K1*Y'$; $G'=K2*Y'$; and $B'=K3*Y'$.

Optionally, the light acquisition device is specifically configured to filter a spectrum component of a first predetermined wavelength range from the incident light to obtain the target light; wherein the first predetermined wavelength range is a spectrum wavelength range in which a difference between responsivities of the RGB channels and of a brightness channel of the image sensor at an infrared band is greater than a first predetermined threshold, the brightness channels being the IR channel or W channel.

Optionally, the light acquisition device includes a band-stop filter and an optical lens of a first type; wherein the optical lens of the first type is configured to transmit the incident light to the band-stop filter in a full spectrum transmission manner; and the band-stop filter is configured to filter the spectrum component of the first predetermined wavelength range from the light transmitted from the optical lens of the first type to obtain the target light.

Optionally, the light acquisition device includes an optical lens of a second type, which is capable of filtering the spectrum component of the first predetermined wavelength range.

Optionally, the first predetermined wavelength range is [T1, T2], wherein the value of T1 is in a range of [600 nm, 800 nm], and the value of T2 is in a range of [750 nm, 1100 nm].

Optionally, during the conversion from the target light to the image signal by the image sensor, in a second predetermined wavelength range of the infrared band, differences between responsivities of the RGB channels are lower than a second predetermined threshold.

Optionally, the second predetermined wavelength range is [T3, T4], wherein T4 is greater than T3, T3 is greater than or equal to 750 nm, and T4 is less than or equal to 1100 nm.

Optionally, during the conversion from the target light into the image signal, the image sensor performs a multiple-exposures acquisition within one frame time.

Optionally, the process that the image processor analyzes the image signal into the RGB color signals and the brightness signal includes:

analyzing an image signal generated by using an exposure of a first type to obtain the RGB color signals; and analyzing an image signal generated by using an exposure of a second type to obtain the brightness signal.

Optionally, an exposure duration of the exposure of the first type is less than that of the exposure of the second type.

Optionally, the multi-spectrum based image fusion apparatus provided by an embodiment of the present application further includes a signal controller, configured to control the image sensor to generate an image signal that meets a predetermined brightness requirement.

Optionally, the signal controller is specifically configured to analyze brightness of image signals generated by the image sensor, and control the image sensor according to an analyzing result to generate the image signal that meets the predetermined brightness requirement.

Optionally, the signal controller is further configured to control the image sensor to switch between one-exposure acquisition and multiple-exposures acquisition.

Optionally, the multi-spectrum based image fusion apparatus provided by an embodiment of the present application further includes an infrared light filling device; wherein the signal controller is further configured to control the infrared light filling device to fill infrared light for the image sensor.

In a second aspect, an embodiment of the present application further provides a multi-spectrum based image fusion method, applicable to a multi-spectrum based image fusion apparatus having five types of photosensitive channels, wherein the five types of photosensitive channels includes red, green and blue RGB channels, an infrared IR channel and a full-band W channel; the method including:

acquiring target light corresponding to incident light;

converting the target light into an image signal through the RGB channels, the IR channel and the W channel; and analyzing the image signal into RGB color signals and a brightness signal, and fusing the RGB color signals and the brightness signal to obtain a fused image, wherein the collection of the channels based on which the RGB color signals and the brightness signal are obtained includes the five types of photosensitive channels.

Optionally, the step of analyzing the image signal into the RGB color signals and the brightness signal includes:

performing an interpolation operation on the W channel of the image signal to generate a brightness signal that has a resolution same as an input resolution, wherein the input resolution is a resolution of the image signal;

performing interpolation operations on the RGB channels and IR channel of the image signal to generate an image signal of each of the channels that has a resolution same as the input resolution; and traversing the image signal of each of the channels, and subtracting a value of an IR parameter for a pixel position respectively from values of the traversed R channel, G channel, or B channel to generate the RGB color signals, wherein the value of the IR parameter is a product of a value of the IR channel at the pixel position and a preset correction value.

Optionally, the step of analyzing the image signal into the RGB color signals and the brightness signal includes:

performing interpolation operations on the RGB channels, the IR channel and the W channel of the image signal to generate an image signal of each of the channels that has a resolution same as an input resolution;

generating the brightness signal by using the image signal of each of the channels, a first predetermined formula and a second predetermined formula; wherein the first predetermined formula is $y=x1*R+x2*G+x3*B$, and x1, x2, and x3 are weights, and wherein the second predetermined formula is the brightness signal $=x4*W+x5*IR+x6*y$, and x4, x5, and x6 are weights;

traversing the image signal of each of the channels, and subtracting a value of an IR parameter for a pixel position respectively from values of the traversed R channel, G channel, and B channel to generate first standby RGB color signals, where the value of the IR parameter is a product of a value of the IR channel at the pixel position and a preset correction value;

traversing the image signal of each of the channels, and subtracting a value of an IR' for a pixel position respectively from values of the traversed R channel, G channel, and B channel to generate second standby RGB color signals, where a value of IR' for the pixel position is obtained by a third predetermined formula as $IR'=(R+G+B-W)/n$; and weighting and combining the first standby RGB color signals and the second standby RGB color signals to generate the RGB color signals.

Optionally, the step of fusing the RGB color signals and the brightness signal to obtain the fused image includes:

converting the RGB color signals into YUV signals, wherein the YUV signals are luminance and chrominance signals;

extracting chrominance UV components in the YUV signals;

combining the UV components with the brightness signal to form new YUV signals; and determining the new YUV signals as the fused image, or converting the new YUV signals into RGB signals and determining the resulting RGB signals as the fused image.

Optionally, the step of fusing the RGB color signals and the brightness signal to obtain a fused image includes:

calculating an auxiliary value Y for each pixel according to the RGB color signals, as $Y=(R*w1+B*w2+G*w3)/(w1+w2+w3)$, wherein R is a value of the R channel corresponding to the pixel, G is a value of the G channel corresponding to the pixel, B is a value of the B channel corresponding to the pixel, and w1, w2 and w3 are weights;

calculating a ratio of the value of each channel of the RGB color signals to the auxiliary value Y to obtain reference channel values K1, K2, and K3 for each pixel, which are calculated as $K1=R/Y$, $K2=G/Y$, $K3=B/Y$;

performing chroma noise reduction on the reference channel values K1, K2, and K3; and fusing the brightness signal Y' with the reference channel values K1-K3 subjected to the chroma noise reduction at the pixel, to generate fused RGB channel values R', G' and B' and to obtain the fused image; wherein R', G' and B' are calculated as $R'=K1*Y'$; $G'=K2*Y'$; and $B'=K3*Y'$.

In a third aspect, an embodiment of the present application further provides an image sensor, having five types of photosensitive channels, wherein the five types of photosensitive channels includes red, green and blue RGB channels, an infrared IR channel and a full-band W channel, a proportion of pixels corresponding to the W channel is greater than a proportion of pixels corresponding to any other photosensitive channels.

Optionally, the proportion of pixels corresponding to the W channel is ½.

Optionally, the proportion pixels corresponding to each photosensitive channel of the RGB channels and the IR channel is the same.

the proportion of pixels corresponding to at least one photosensitive channel of the RGB channels and the IR channel is different from the proportions of pixels corresponding to the other photosensitive channels.

Optionally, the proportion of pixels corresponding to each photosensitive channel of the RGB channels is the same.

Optionally, when the proportion of pixels corresponding to the W channel is ½, pixels corresponding to each of the five types of photosensitive channels are arranged as a uniform mesh.

In a fourth aspect, an embodiment of the present application provides a storage medium for storing executable codes that, when executed, perform the steps of a multi-spectrum based image fusion method provided by the embodiments of the present application of the second aspect.

In a fifth aspect, an embodiment of the present application provides an application program that, when executed, perform steps of an multi-spectrum based image fusion method provided by the embodiments of the present application of the second aspect.

In the embodiments of the present application, the multi-spectrum based image fusion apparatus includes a light acquisition device, an image processor, and an image sensor having five types of photosensitive channels. The five types of photosensitive channels including red, green and blue RGB channels, an infrared IR channel and a full-band W channel. The operations of processing the signals are: the light acquisition device acquires target light corresponding to incident light; the image sensor converts the target light into an image signal through the RGB channels, the IR channel and the W channel; the image processor analyzes the image signal into RGB color signals and a brightness signal and fuses the RGB color signals and the brightness signal to obtain a fused image. The collection of the channels based on which the RGB color signals and the brightness signal are obtained includes the five types of photosensitive channels. In the present solution, the image sensor having five types of photosensitive channels is used to acquire images. Compared with means that needs a special design for its optical system to acquire infrared light and visible light simultaneously, the complexity of the structure is greatly reduced, which allows the image fusion apparatus to be widely used.

Further, embodiments of the present application further provide a multi-spectrum based image fusion method, which is applicable to a multi-spectrum based image fusion apparatus. The multi-spectrum based image fusion apparatus has five types of photosensitive channels. The five types of photosensitive channels include red, green and blue RGB channels, an infrared IR channel and a full-band W channel. The method includes: acquiring target light corresponding to incident light; converting the target light into an image signal through the RGB channels, the IR channel and the W channel; analyzing the image signal into RGB color signals and a brightness signal and fusing the RGB color signals and the brightness signal to obtain a fused image. The collection of the channels based on which the two types of signals, i.e., the RGB color signals and the brightness signal, are obtained includes the five types of photosensitive channels. In the present solution, the objective of acquiring a dual-band image through an apparatus with simple structure is achieved.

Furthermore, embodiments of the present application further provide an image sensor having five types of photosensitive channels. The five types of photosensitive channels include red, green and blue RGB channels, an infrared IR channel and a full-band W channel, wherein the proportion of pixels corresponding to the W channel is greater than the proportion of pixels corresponding to any other photosensitive channel.

Since the image sensor provided by the embodiments of the present application can acquire five types of spectrum components. The W channel with a higher sensitivity has a higher proportion of pixels accordingly, and can acquire more spectrum components, thereby greatly improving the quality of images acquired by the image sensor.

BRIEF DESCRIPTION OF THE DRAWINGS

In order to illustrate the technical solutions of the embodiments of the present application and the related art more clearly, drawings used in the embodiments and the related art will be briefly described below. It is obvious that the drawings in the following description are only for some embodiments of the present application. Those of ordinary skills in the art may obtain other drawings based on the drawings herein without any creative efforts.

DETAILED DESCRIPTION

To make the objective, technical solutions, and advantages of the present application more clear, the present application will illustrate the embodiments in details below with reference to the accompanying drawings. It is apparent that the described embodiments are only some embodiments of the present application, instead of all of them. Any other embodiments obtained by one of ordinary skills in the art based on the embodiments herein without any creative efforts fall within the protection scope of the present application.

In order to solve the problem that the structure of the image acquisition apparatus with the beam splitting and fusion function is complex, an embodiment of the present application provides a multi-spectrum based image fusion apparatus.

Figure 1:
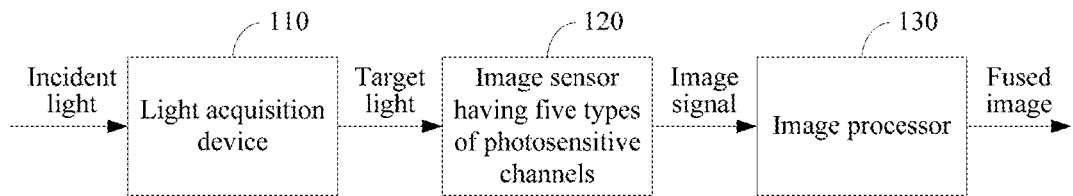
FIG. 1 is a schematic diagram showing the structure of a multi-spectrum based image fusion apparatus provided by an embodiment of the present application.

As shown in FIG. 1, the multi-spectrum based image fusion apparatus provided by an embodiment of the present application may include:

a light acquisition device 110, an image processor 130, and an image sensor 120 having five types of photosensitive channels. The five types of photosensitive channels including red, green and blue RGB channels, an infrared IR channel and a full-band W channel.

The light acquisition device 110 is configured to acquire target light corresponding to incident light.

The image sensor 120 is configured to convert the target light into an image signal through the RGB channels, the IR channel and the W channel.

The image processor 130 is configured to analyze the image signal into RGB color signals and a brightness signal, and fuse the RGB color signals and the brightness signal to obtain a fused image. The collection of the channels based on which the RGB color signals and the brightness signal includes the five types of photosensitive channels.

Figure 2:
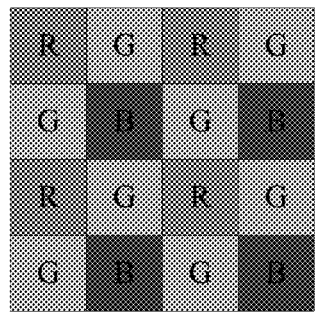
FIG. 2 is a schematic diagram showing a Bayer pattern.

Those skilled in the art can appreciate that the Bayer pattern is a data format for the image sensor. FIG. 2 is a diagram schematically showing the Bayer pattern, which outputs the red, green, and blue dot matrix information in a mosaic manner. An image sensor based on Bayer pattern has only three photosensitive channels, i.e., RGB channels, and cannot obtain the infrared spectrum component. Thus, in order to obtain a dual-band fused image, it is necessary to use a prism beam splitter, different optical sensors, and the like to simultaneously acquire infrared light and visible light, which results in a complex structure. In order to reduce the complexity of the structure, the image sensor employed in the embodiment of the present application is an image sensor having five types of photosensitive channels. In this case, multiple spectrum components can be obtained with one single image sensor.

Figure 3:
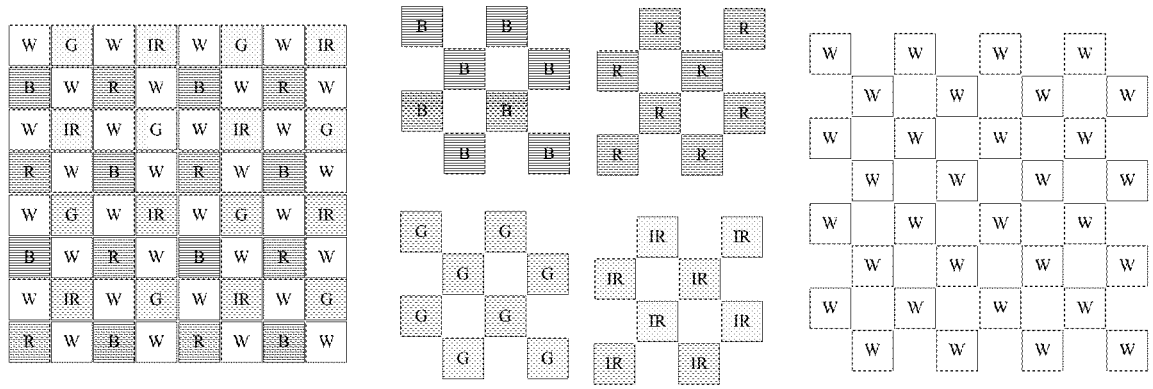
FIG. 3 is a schematic diagram showing an array and arrangements of pixels corresponding to an image sensor in the embodiment of the present application.

Specifically, FIG. 3 schematically shows a diagram of an array and arrangements of pixels corresponding to the image sensor 120 in the embodiment of the present application. As shown in FIG. 3, the image sensor 120 provided by the embodiments of the present application can include five types of photosensitive channels, namely, the RGB channels, the infrared IR channel, and the full-band W channel. Specifically, the RGB channels can be photosensitive to both visible light band and infrared band, and the RGB channels are primarily used to acquire visible light. The IR channel is a channel photosensitive to the infrared band. The W channel is a channel photosensitive to all bands, in other words, the W channel can acquire visible light and infrared light. It should be noted that FIG. 3 merely shows an illustrative example and should not be construed as limiting the embodiments of the present application. In addition, those skilled in the art can appreciate that, in practical applications, there are various arrays and pixel arrangements corresponding to the image sensor 120, all of which can be applied to the embodiments of the present application. It should be noted that the light acquisition device 110 can be an optical lens capable of transmitting incident light in a full spectrum transmission manner. In this way, the target light is of all spectral bands.

It should be emphasized that the collection of the channels based on which the image processor 130 obtains the RGB color signals and the brightness signal includes the five types of photosensitive channels. In other words, the RGB color signals and the brightness signal can be obtained respectively by analyzing based on some of the five types of photosensitive channels, but the collection of the channels based on which the RGB color signals and the brightness signal are obtained includes the five types of photosensitive channels. For example, if the RGB color signals obtained is analyzed by using the RGB channels and the IR channel, and the brightness signal is obtained by using the W channel, it indicates that the collection of the channels based on which the RGB color signals and the brightness signal includes the five types of photosensitive channels. If the RGB color signals are obtained by using the RGB channels, the IR channel and the W channel, and the brightness signal is obtained by using the IR channel and the W channel, it indicates that the collection of the channels based on which the RGB color signals and the brightness signal are obtained includes the five types of photosensitive channels. If the RGB color signals are obtained by using the RGB channels, and the brightness signal is obtained by using the RGB channels and the W channel, it indicates that the collection of the channels used to obtain the RGB color signals and the brightness signal does not include the five types of photosensitive channels. If the RGB color signals are obtained by using the RGB channels, and the brightness signal is obtained by using the W channel, it indicates that the collection of the channels used to obtain the RGB color signals and the brightness signal does not include the five types of photosensitive channels. Optionally, in a specific implementation, the process that the image processor 130 analyzes the image signal into the RGB color signals and the brightness signal may include:

step a1, performing an interpolation operation on the W channel of the image signal to generate the brightness signal that has a resolution same as an input resolution, wherein the input resolution is the resolution of the image signal;

step a2, performing interpolation operations on the RGB channels and IR channel of the image signal to generate an image signal of each of the channels that has a resolution same as the input resolution; and step a3, traversing the image signal of each of the channels, and subtracting a value of an IR parameter for a pixel position respectively from values of the traversed R channel, G channel and B channel, to generate the RGB color signals, wherein the value of the IR parameter is the product of the value of the IR channel at the pixel position and a preset correction value.

It can be appreciated that subtracting the value of the IR parameter for the pixel position respectively from the values of the traversed R channel, G channel and B channel, namely, removing the infrared components from the color signals, can avoid the crosstalk between the infrared component and the RGB signal components of the color signals, thereby improving the quality of the image under low illumination.

Figure 4:
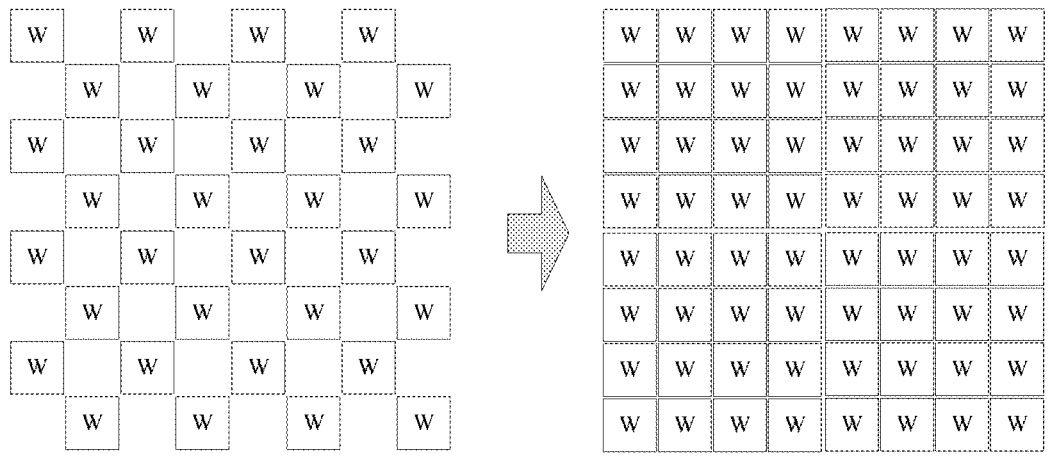
FIG. 4 is a schematic diagram showing the generation of a brightness signal according to an embodiment of the present application.

It should be emphasized that the preset correction value can be set depending on actual conditions. Generally, the preset correction value may be set to 1, for example. Of course, the preset correction value can be set to any integer or fraction ranging from 0 to 1024 depending on actual conditions. Those skilled in the art can appreciate that the preset correction value is not limited thereto. Taking the arrays shown in FIG. 3 as an example, each small square corresponds to one pixel, and the resolution of the image signal generated by the image sensor 120 is 8*8, as shown in FIG. 3. Since the brightness signal generated by the interpolation of the W channel of the image signal has a resolution same as the input resolution, the brightness signal generated by interpolation of the W channel of the image signal shown in FIG. 3 also has a resolution of 8*8. FIG. 4 is a diagram schematically shows the generation of the brightness signal. Moreover, the W channel of the image signal may be interpolated using such as a bilinear interpolation algorithm or a bicubic interpolation algorithm, and the specific interpolation process is not limited herein. It should be emphasized that the resolution of the image signals generated by the image sensor 120 in the embodiments of the present application are related to the structure of the array. The resolution of 8*8 is only the resolution corresponding to the image sensor having a structure of the array shown in FIG. 3, which should not constitute any limitation to the embodiments of the present application.

Figure 5:
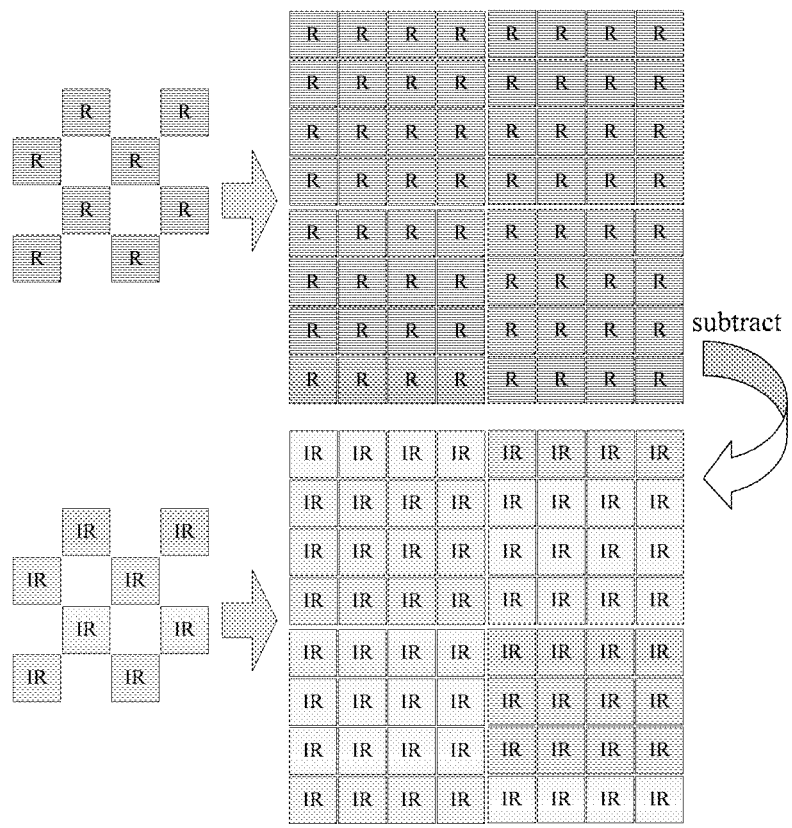
FIG. 5 is a schematic diagram showing interpolation results of the R channel and IR channel and a process of removing the infrared component from the R channel according to an embodiment of the present application.

Similarly, the interpolation operations are performed on the R channel, the G channel, the B channel and the IR channel of the image signal respectively, and the generated image signal of each channel has the resolution same as the input resolution. Therefore, taking FIG. 3 as an example, the image signal of each channel generated by interpolating the R channel, the G channel, the B channel, or the IR channel of the image signal also has a resolution of 8*8. The interpolation results of the R channel and the IR channel are as shown in FIG. 5. Moreover, the algorithm used for the interpolations of the RGB channels and the IR channel of the image signal may be such as a bilinear interpolation, or bicubic interpolation. The interpolation algorithm used for the interpolations of the W channel, the RGB channels and the IR channel may or may not be the same, which is not limited herein. It should be emphasized that the resolution of the image signals generated by the image sensor 120 in the embodiments of the present application are related to the structure of the array, and the resolution of 8*8 is only the resolution corresponding to the image sensor having a structure of the array shown in FIG. 3, which should not constitute any limitation to the embodiments of the present application.

The infrared component in the RGB channels has to be removed. Thus, it is necessary to traverse the image signal of each of the channels and subtract the value of the IR parameter for the pixel position respectively from the values of the traversed R channel, G channel, and B channel, to generate RGB color signals. The process of removing the infrared component from the R channel is as shown in FIG. 5.

Optionally, in another specific implementation, the process that the image processor analyzes the image signal into the RGB color signals and the brightness signal may include:

step b1, performing interpolation operations on the RGB channels, the IR channel and the W channel of the image signal to generate an image signal of each channel that has a resolution same as an input resolution;

step b2, generating the brightness signal by using the image signals of the channels, a first predetermined formula and a second predetermined formula; wherein the first predetermined formula is $y=x_1*R+x_2*G+x_3*B$, where $x_1$, $x_2$, and $x_3$ are weights; the second predetermined formula is the brightness signal$=x_4*W+x_5*IR+x_6*y$, where $x_4$, $x_5$, and $x_6$ are weights; and wherein R is the value of the R channel corresponding to the pixel, G is the value of the G channel corresponding to the pixel, B is the value of the B channel corresponding to the pixel, W is the value of the W channel corresponding to the pixel, and IR is the value of the IR channel corresponding to the pixel;

step b3, traversing the image signal of each of the channels, and subtracting a value of an IR parameter for a pixel position respectively from values of the traversed R channel, G channel, and B channel to generate first standby RGB color signals, wherein the value of the IR parameter is the product of the value of the IR channel at the pixel position and a preset correction value;

step b4, traversing the image signal of each of the channels, and subtracting a value of an IR' for a pixel position respectively from values of the traversed R channel, G channel, and B channel to generate second standby RGB color signals, where the value of IR' for each pixel position is calculated using a third predetermined formula as IR'= (R+G+B−W)/n; and wherein R is the value of the R channel corresponding to the pixel, G is the value of the G channel corresponding to the pixel, B is the value of the B channel corresponding to the pixel, W is the value of the W channel corresponding to the pixel, and IR is the value of the IR channel corresponding to the pixel; and step b5, weighting and combining the first standby RGB color signals and the second standby RGB color signals to generate the RGB color signals.

It should be noted that in this specific implementation, the interpolation algorithm used for the interpolation operations on the RGB channels, the IR channel and the W channel of the image signal may be bilinear interpolation, bicubic interpolation, etc. Furthermore, taking the arrays shown in FIG. 3 as an example again, the resolution of the image signals generated by the image sensor 120 is 8*8. Therefore, the resolution of the image signal of each channel generated by respective interpolation operations on the R channel, the G channel, the B channel, the W channel and the IR channel of the image signal is also 8*8. The interpolation result corresponding to the W channel is as shown in FIG. 4, and the interpolation results corresponding to the R channel and the IR channel are as shown in FIG. 5. It should be emphasized that the resolution of the image signals generated by the image sensor 120 in the embodiments of the present application is related to the structure of the array. The resolution of 8*8 is only the resolution corresponding to the image sensor having the array structure shown in FIG. 3, which should not constitute any limitation to the embodiments of the present application.

Moreover, in this specific implementation, for the generation of the brightness signal, it can be appreciated that all the weights x1, x2, and x3 have a value range of [0, 1], and x1+x2+x3=1. Similarly, all the weights x4, x5, and x6 have a value range of [0, 1], and x4+x5+x6=1.

In this specific implementation, to generate the color signals, the first standby RGB color signals R1, G1, B1 are generated by removing the infrared component from the color signals according to the RGB channels and the IR channel by R1=R−IR*(the preset correction value), G1=G−IR*(the preset correction value) and B1=B−IR*(the preset correction value). IR' at each pixel position is then calculated as (R+G+B−W)/n, and the infrared components are removed from the color signals by R2=R−IR', G2=G−IR', B2=B−IR' to generate the second standby RGB color signals R2, G2, and B2. At the end, the first standby RGB color signals and the second standby RGB color signals are weighted and combined to generate the RGB color signals, as R'=e1*R1+ e2*R2, G'=e1*G1+e2*G2, and B'=e1*B1+e2*B2. The weights e1 and e2 have a value range of [0, 1] and e1+e2=1. It can be appreciated that removing the infrared components can avoid the crosstalk between the infrared component and the RGB signal components in the color signals, thereby improving the quality of the image under low illumination.

It should be noted that in this specific implementation, the value of n in the third predetermined formula can be set depending on actual conditions. For example, n can be set to any integer or fraction ranging from 0 to 1024 depending on actual conditions, and those skilled in the art can appreciated that the value of n is not limited thereto. Similarly, in this specific implementation, the preset correction value can be set depending on actual conditions. Generally, the preset correction value may be set to 1, for example. Of course, the preset correction value can be set to any integer or fraction ranging from 0 to 1024 depending on actual conditions. Those skilled in the art can appreciate that the value of the preset correction value is not limited thereto.

It should be emphasized that the above specific implementation that the image processor 130 analyzes the image signal into the RGB color signals and the brightness signal is only an example and should not be construed as limiting the embodiments of the present application.

It can be understood that after the RGB color signals and the brightness signal are generated, there are several specific implementations for the image processor 130 to fuse the RGB color signals and the brightness signal to obtain the fused image. Two implementations will be described in detail below.

In a specific implementation, the process that the image processor 130 fuses the RGB color signals and the brightness signal to obtain the fused image includes:

step c1, converting the RGB color signals into YUV signals, wherein the YUV signals are luminance and chrominance signals;

step c2, extracting chrominance UV components in the YUV signals;

step c3, combining the UV components with the brightness signal to form new YUV signals; and step c4, determining the new YUV signals as the fused image, or converting the new YUV signals into RGB signals and determining the resulting RGB signals as the fused image.

It can be appreciated that in the YUV format, "Y" represents Luminance or Luma, i.e., the gray level value; and "U" and "V" represent Chrominance or Chroma, which describe the color and saturation of an image and are used to specify the color of a pixel. After extracting the UV components and before combining the UV components and the brightness signal, a noise reduction may be applied to the UV components to remove chroma noise, which improves the quality of the fused image. The method for the noise reduction may include but is not limited to Gaussian filtering. It should be emphasized that the conversion between the YUV signals and the RGB color signals can be implemented by any of existing algorithms in the related art, and the extraction of the UV components from the YUV signals and combination of the UV components with the brightness signal can be performed by using related techniques.

In another specific implementation, the process that the image processor 130 fuses the RGB color signals and the brightness signal to obtain the fused image includes:

step d1, calculating an auxiliary value Y for each pixel according to the RGB color signals, as Y=(R*w1+B*w2+ G*w3)/(w1+w2+w3), where R is the value of the R channel corresponding to the pixel, G is the value of the G channel corresponding to the pixel, B is the value of the B channel corresponding to the pixel, and w1, w2 and w3 are weights;

step d2, calculating a ratio of the value of each channel of the RGB color signals to the auxiliary value Y to obtain reference channel values K1, K2, and K3 for the pixel, which are calculated as K1=R/Y, K2=G/Y, K3=B/Y;

step d3, performing chroma noise reduction on the reference channel values K1, K2, and K3; and step d4, fusing a brightness signal Y' with the reference channel values K1-K3 subjected to the chroma noise reduction at the pixel, to generate fused RGB channel values R', G' and B' and to obtain the fused image; which are calculated as R'=K1*Y'; G'=K2*Y'; B'=K3*Y'.

The embodiments of the present application do not limit the values of the weights w1, w2, and w3. The method for performing the chroma noise reduction may include, but is not limited to, Gaussian filtering. For example, assuming w1=1, w2=1 and w3=1, Y=(R+G+B)/3.

It should be emphasized that the above specific implementation that the image processor 130 fuses the RGB color signals and the brightness signal to obtain the fused image is only for exemplary illustration and should not be construed as limiting the embodiments of the present application. In addition, it can be appreciated that the image processor 130 may first optimize the RGB color signals and the brightness signal, and then fuse the optimized RGB color signals with the optimized brightness signal to obtain the fused image. For example, the optimization of the RGB color signals may include performing low-pass filtering on the RGB color signals to reduce the noise of the RGB color signals. The optimization of the brightness signal may include performing high-pass filtering on the brightness signal to implement edge enhancement of the brightness signal.

It can be seen, in the present solution, an image sensor having five types of photosensitive channels is used to acquire images. Compared to means that requires special design on the optical system to acquire the infrared light and the visible light simultaneously, the complexity of the structure of the image fusion apparatus is greatly reduced, which allows the it to be widely used.

Optionally, in a specific implementation, in order to improve the quality of the image fusion, the light acquisition device 110 is specifically configured to filter a spectrum component of a first predetermined wavelength range from the incident light to obtain the target light. The first predetermined wavelength range is a spectrum wavelength range in which the difference between responsivities of the RGB channels and of a brightness channel of the image sensor 120 is greater than a first predetermined threshold. This brightness channel is the IR channel or W channel. It should be emphasized that the value of the first predetermined threshold may be set depending on actual conditions, and is not limited herein. It should be emphasized that, as long as any of three differences, which are the difference between the responsivity of the R channel and the responsivity of the brightness channel, the difference between the responsivity of the G channel and the responsivity of the brightness channel, and the difference between the responsivity of the B channel and the responsivity of the brightness channel, is higher than the first predetermined threshold, the light acquisition device 110 can filter the spectrum component of a related wavelength range.

Figure 6:
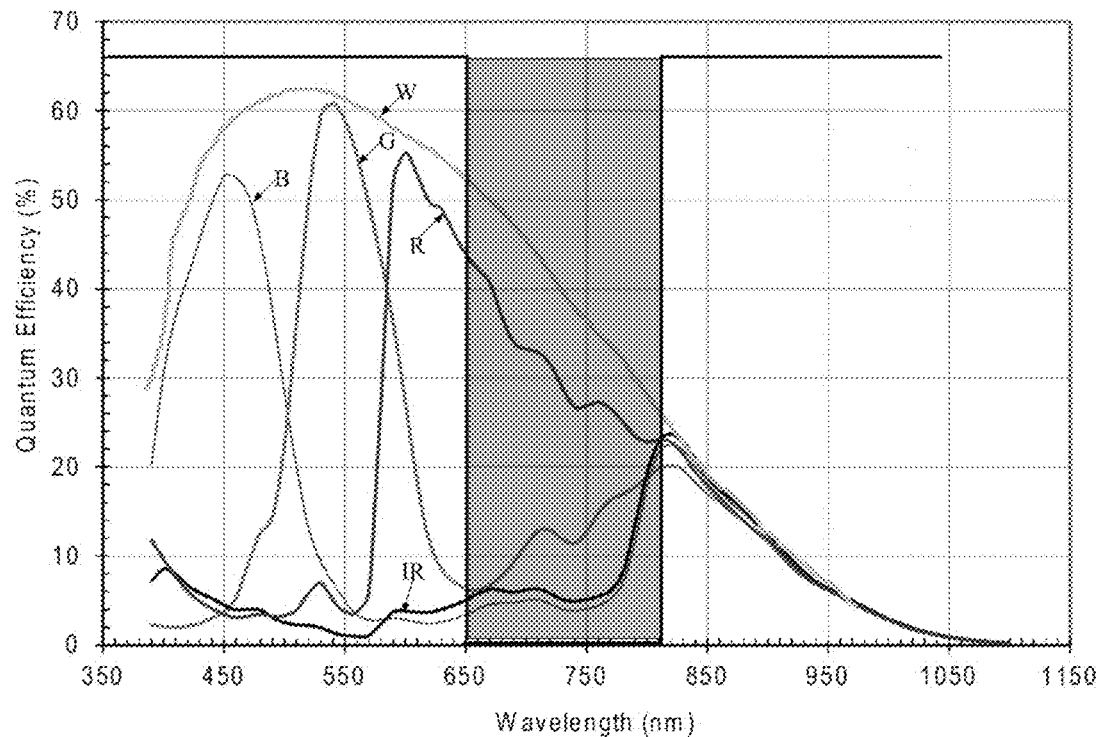
FIG. 6 is a schematic diagram showing the principle of spectrum filtering.

Specifically, in order to pass the infrared band and the visible band, the first predetermined wavelength range may be [T1, T2], where the value of T1 is in the range of [600 nm, 800 nm], and the value of T2 is in the range of [750 nm, 1100 nm]. It can be understood that with the additional function of filtering the spectrum of the predetermined wavelength range from the incident light, in the image sensor 120, the spectrum component in which there is a larger difference between the responsivities at the infrared band (650-1100 nm) of the RGB channels and the responsivity of the brightness channel is filtered out. Thereby, the RGB color signals and brightness signal can be precisely restored from the image signal generated by the image sensor 120 through simple operations. As shown in FIG. 6, the gray part is the spectrum portion that needs to be filtered out. In FIG. 6, IR represents infrared signals, W represents signals of all bands, R represents red light signals, G represents green light signals, and B represents blue light signals. It should be emphasized that FIG. 6 is merely an example and should not be construed as limiting the embodiments. Generally, due to the manufacturing process or the like, the actual filtering curves have slopes that are not as steep as those shown in FIG. 6.

In order to filter the spectrum of the first predetermined wavelength range from the incident light, in a specific implementation, the light acquisition device 110 may include a band-stop filter and an optical lens of a first type.

The optical lens of the first type is configured to transmit the incident light to the band-stop filter in a full spectrum transmission manner.

The band-stop filter is configured to filter the spectrum component of the first predetermined wavelength range from the light transmitted from the optical lens of the first type to obtain the target light.

Specifically, for example, the band-stop filter may be a coating integrated on the optical lens of the first type by coating; or the band-stop filter may be a patch disposed on the optical lens of the first type. Moreover, it should be noted that the full spectrum transmission manner is a manner in which the spectrum components of all bands are transmitted, that is, no spectrum is filtered out. Since the optical lens of the first type transmits the incident light to the band-stop filter in a full-spectrum transmission manner, the light transmitted by the optical lens of the first type has a band same as the band of the incident light. That is, the optical lens of first type does not filter the spectrum of any band. In order to filter the spectrum of the first predetermined wavelength from the incident light, in another implementation, the light acquisition device 110 includes an optical lens of a second type, which is capable of filtering the spectrum component of the first predetermined wavelength range.

It should be emphasized that, the specific implementation of the light acquisition device 110 above to filter the spectrum component of the first predetermined wavelength range from the incident light is merely an example, which should not constitute any limitation to the embodiments of the present application.

Optionally, in a specific implementation, while the image sensor 120 converts the target light into the image signal, in a second predetermined wavelength range of an infrared band, the differences between responsivities of the RGB channels are lower than a second predetermined threshold to ensure the precise restoration of color signals after the infrared component is removed, which improves the quality of the image fusion. The second predetermined wavelength range is [T3, T4], where T4 is greater than T3, T3 is greater than or equal to 750 nm, and T4 is less than or equal to 1100 nm. For example, as shown in FIG. 6, while the image sensor 120 converts the target light into the image signal, the responsivities of the RGB channels in the band at the right of the gray part satisfies a certain constraint. It should be emphasized that the second predetermined threshold may be set depending on actual conditions, which is not limited herein.

It should be noted that, the image sensor 120 may have different structures, to allow the differences between the responsivities of the RGB channels in the second predetermined wavelength range of the infrared band to be lower than the second predetermined threshold, which is not limited herein. For example, specific optical components such as filters may be added to the image sensor.

Optionally, in the process of converting the target light into the image signal, the image sensor 120 may perform multiple-exposures acquisition in one frame time. In an implementation, one or multiple exposures can be set manually for the image sensor 120.

Moreover, as to the multiple-exposures acquisition in one frame time for the image sensor 120, the process that the image processor 130 analyzes the image signal into the RGB color signals and the brightness signal may include:

analyzing an image signal generated by using an exposure of a first type to obtain the RGB color signals; and analyzing an image signal generated by using an exposure of a second type to obtain a brightness signal.

The exposure of the first type and the exposure of the second type may have the same exposure duration or different exposure durations. When the exposure of the first type and the exposure of the second type have different exposure durations, the exposure duration of the exposure of the first type may be less than the exposure duration of the exposure of the second type. Of course, the exposure duration of the exposure of the first type may be greater than the exposure duration of the exposure of the second type. Specifically, the specific process of analyzing an image signal generated by using the exposure of the first type to obtain the RGB color signals may be refer to the above process of obtaining RGB color signals, the specific process of analyzing an image signal generated by using the exposure of the second type to obtain the brightness signal may refer to the above process of obtaining the brightness signal, which will not be repeated herein.

It should be noted, in order to ensure sufficient infrared signals, an image signal generated with a short exposure may be used to obtain RGB color signals, and an image signal generated with a long exposure may be used to obtain a brightness signal, to improve the quality of the image. At this point, the exposure duration of the exposure of the first type is less than the exposure duration of the exposure of the second type.

Figure 7:
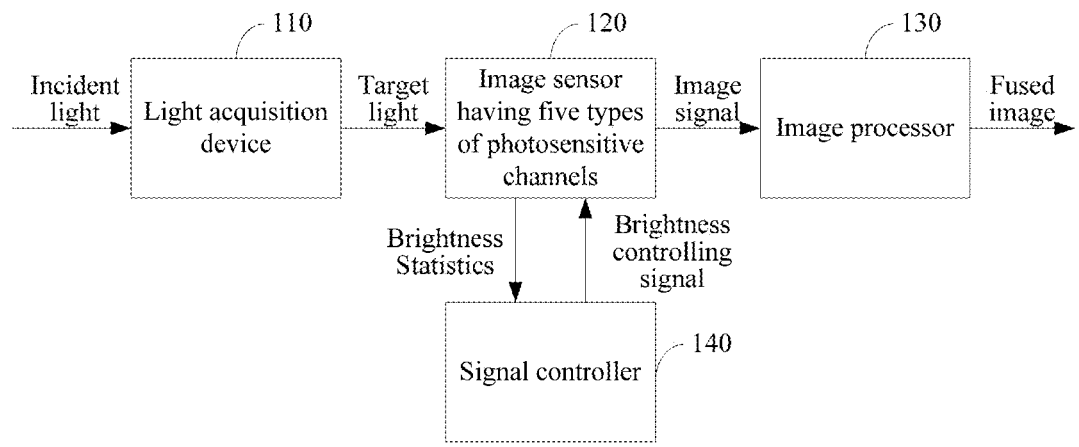
FIG. 7 is another schematic diagram showing the structure of a multi-spectrum based image fusion apparatus provided by an embodiment of the present application.

Optionally, as shown in FIG. 7, the multi-spectrum based image fusion apparatus provided by an embodiment of the present application may further include:

a signal controller 140, configured to control the image sensor 120 to generate an image signal that meets a predetermined brightness requirement.

Specifically, in an implementation, the signal controller may be specifically configured to analyze brightness of image signals generated by the image sensor 120, and control the image sensor 120 according to the analyzing result to generate an image signal that meets the predetermined brightness requirement. Specifically, the signal controller 140 may perform steps of: (a) generating an initial brightness control signal and transmitting it to the image sensor 120; (b) calculating the average brightness of the image signal generated by the image sensor 120, that is, averaging all the pixel values; and (c) calculating the difference between the average brightness and a reference value, and if the difference is within a predetermined range, maintaining the value of the current brightness control signal unchanged; if the difference is not in the predetermined range and greater than the reference value, lowering the value of the brightness control signal; and if the difference is not in the predetermined range and less than the reference value, increasing the value of the brightness control signal.

Of course, in another implementation, the signal controller 140 may periodically send a predetermined brightness control signal to the image sensor. The predetermined brightness control signal is a control signal set according to a predetermined brightness requirement.

It can be understood that the signal controller 140 can also be configured to control the image sensor 120 to switch between one-exposure acquisition and multiple-exposures acquisition. It should be emphasized that the specific implementation of the signal controller 140 controlling the image sensor 120 to generate the image signal that meets the predetermined brightness requirement is merely an example and should not be construed as limiting the embodiments of the present application.

Figure 8:
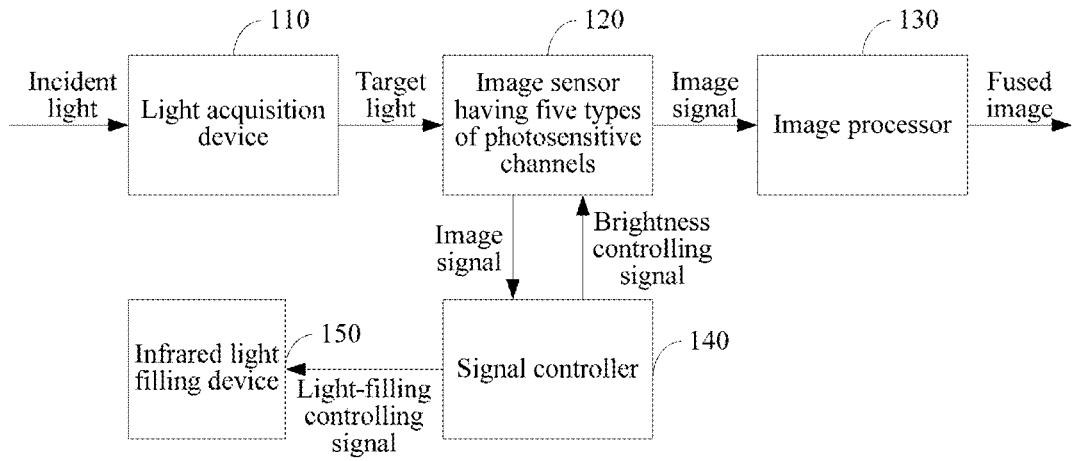
FIG. 8 is yet another schematic diagram showing the structure of a multi-spectrum based image fusion apparatus provided by an embodiment of the present application.

Optionally, in an environment with low illumination, it is possible to compensate for the low illumination by providing infrared light, in order to ensure that the fused image has ideal brightness and a high signal to noise ratio. Based on this concept, the multi-spectrum based image fusion apparatus provided by an embodiment of the present application may further include an infrared light filling device 150, as shown in FIG. 8.

The signal controller 140 is further configured to control the infrared light filling device 150 to fill infrared light for the image sensor.

Specifically, in a specific implementation, the signal controller 140 can detect the gain value g of the brightness control signal. When g is greater than a threshold T1, a light-filling controlling signal is set to 1 to enable infrared light filling. When g is smaller than a threshold T2, the light-filling controlling signal is set to 0 to disable infrared light filling. T1 is greater than T2.

It should be emphasized that the values of T1 and T2 can be set according to actual needs, which are not limited herein. In addition, the above implementation of the signal controller 140 controlling the infrared light filling device 150 to fill infrared light for the image sensor is merely an example and should not be construed as limiting the embodiments of the present application.

Figure 9:
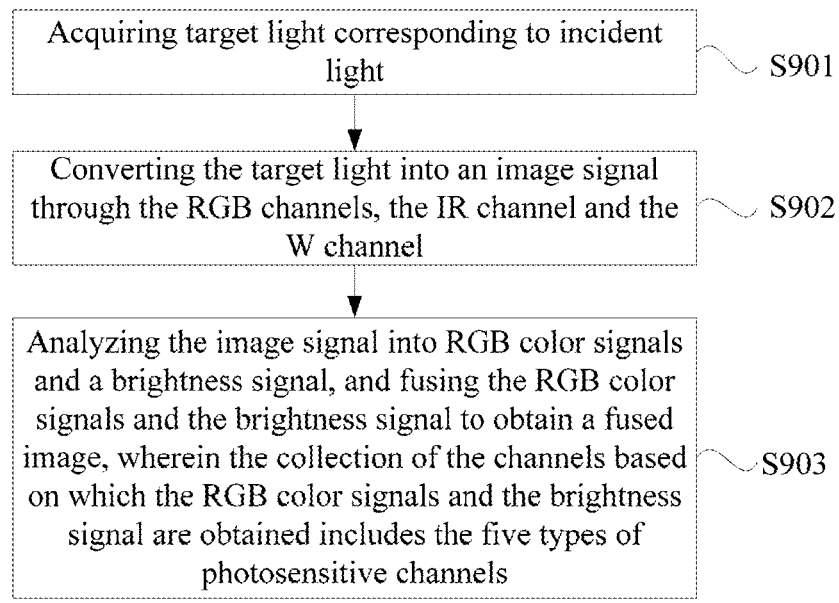
FIG. 9 is a flowchart of a multi-spectrum based image fusion method provided by an embodiment of the present application.

Based on the multi-spectrum based image fusion apparatus provided by the above embodiments of the present application, an embodiment of the present application further provides a multi-spectrum based image fusion method, which is applicable to the multi-spectrum based image fusion apparatus provided by the above embodiments. The multi-spectrum based image fusion apparatus has five types of photosensitive channels, which include red, green and blue RGB channels, an infrared IR channel and a full-band W channel. As shown in FIG. 9, the method includes steps S901-S903.

S901, acquiring target light corresponding to incident light.

S902, converting the target light into an image signal through the RGB channels, the IR channel and the W channel.

An existing approach in the related art may be employed to convert the target light into the image signal through the RGB channels, which will not be specified herein.

S903, analyzing the image signal into RGB color signals and a brightness signal, and fusing the RGB color signals and the brightness signal to obtain a fused image, wherein the collection of the channels based on which the RGB color signals and the brightness signal are obtained includes the five types of photosensitive channels.

For the specific structure of the multi-spectrum based image fusion apparatus, reference may be made to the above embodiments, which will not be repeated herein.

It should be emphasized that the collection of the channels based on which the RGB color signals and the brightness signal are obtained by the image processor 130 includes the five types of photosensitive channels. In other words, the RGB color signals and the brightness signal can be obtained respectively based on some of the five types of photosensitive channels, but the channels based on which the RGB color signals are obtained and channels based on which the brightness signal is obtained include the five types of photosensitive channels.

Optionally, in a specific implementation, the step of analyzing the image signal into the RGB color signals and the brightness signal may include:

step a1, performing an interpolation operation on the W channel of the image signal to generate a brightness signal that has a resolution same as an input resolution, wherein the input resolution is the resolution of the image signal;

step a2, performing interpolation operations on the RGB channels and IR channel of the image signal to generate an image signal of each of the channels that has a resolution same as the input resolution; and step a3, traversing the image signal of each of the channels and subtracting the value of an IR parameter for a pixel position respectively from values of the traversed R channel, G channel, and B channel to generate the RGB color signals, wherein the value of the IR parameter is the product of the value of the IR channel at the pixel position and a preset correction value.

For details of the steps a1-a3, reference may be made to the corresponding description for the multi-spectrum based image fusion apparatus provided by the above embodiments, which will not be repeated herein.

Optionally, in another specific implementation, the step of analyzing the image signal into the RGB color signals and the brightness signal may include:

step b1, performing interpolation operations on the RGB channels, the IR channel and the W channel of the image signal to generate an image signal of each of the channels that has a resolution same as the input resolution;

step b2, generating the brightness signal by using the image signal of each of the channels, a first predetermined formula, and a second predetermined formula; wherein the first predetermined formula is $y=x1*R+x2*G+x3*B$, with x1, x2, and x3 being weights, and wherein the second predetermined formula is the brightness signal=$x4*W+x5*IR+x6*y$, with x4, x5, and x6 being weights;

step b3, traversing the image signal of each of the channels and subtracting the value of an IR parameter for a pixel position respectively from values of the traversed R channel, G channel, and B channel to generate first standby RGB color signals, where the value of the IR parameter is the product of the value of the IR channel in the pixel position and the preset correction value;

step b4, traversing the image signal of each of the channels and subtracting the value of an IR' for a pixel position respectively from values of the traversed R channel, G channel, and B channel to generate second standby RGB color signals, where the value of IR' corresponding to the pixel position is obtained by a third predetermined formula $R'=(R+G+B-W)/n$; and step b5, weighting and combining the first standby RGB color signals and the second standby RGB color signals to generate the RGB color signals.

For details of the steps b1-b5 of the present embodiment, reference may be made to the corresponding descriptions of the embodiments of the multi-spectrum based image fusion apparatus, which will not be repeated herein. It should be noted that there are several specific implementations of fusing the RGB color signals and the brightness signal to obtain the fused image. Two implementations will be described below in detail.

Optionally, in a specific implementation, the step of fusing the RGB color signals and the brightness signal to obtain the fused image may include:

step c1, converting the RGB color signals into YUV signals, wherein the YUV signals are luminance and chrominance signals;

step c2, extracting chrominance UV components in the YUV signals;

step c3, combining the UV components with the brightness signal to form new YUV signals; and step c4, determining the new YUV signals as the fused image, or converting the new YUV signals into RGB signals and determining the resulting RGB signals as the fused image.

For details of the steps c1-c4 of the present embodiment, reference may be made to the corresponding descriptions of the embodiments of multi-spectrum based image fusion apparatus, which will not be repeated herein.

Optionally, in another specific implementation, the step of fusing the RGB color signals and the brightness signal to obtain a fused image may include:

step d1, calculating an auxiliary value Y for each pixel according to the RGB color signals, wherein Y is calculated as $Y=(R*w1+B*w2+G*w3)/(w1+w2+w3)$, R is the value of the R channel corresponding to the pixel, G is the value of the G channel corresponding to the pixel, B is the value of the B channel corresponding to the pixel, and w1, w2 and w3 are weights;

step d2, calculating a ratio of the value of each channel the RGB color signals to the auxiliary value Y to obtain reference channel values K1, K2, and K3 for each pixel, which are calculated as $K1=R/Y$, $K2=G/Y$, $K3=B/Y$;

step d3, performing chroma noise reduction on the reference channel values K1, K2, and K3; and step d4, fusing the brightness signal Y' with the reference channel values K1-K3 subjected to the chroma noise reduction at the pixel, to generate fused RGB channel values R', G' and B' and to obtain the fused image; wherein R', G' and B' are calculated as $R'=K1*Y'$; $G'=K2*Y'$; $B'=K3*Y'$.

For details of the steps d1-d4 of the present embodiment, reference may be made to the corresponding descriptions for the embodiments of the multi-spectrum based image fusion apparatus, which will not be repeated herein.

In addition, in the process of converting the target light into the image signal, the multi-spectrum based image fusion apparatus may perform a multiple-exposures acquisition within one frame time. A user can set the apparatus to use single exposure or multiple exposures, which is not limited herein. Moreover, for multiple-exposures acquisitions in one frame time, the process of analyzing the image signal into the RGB color signals and the brightness signal may include:

analyzing an image signal generated by using an exposure of a first type to obtain the RGB color signals; and analyzing an image signal generated by using an exposure of a second type to obtain a brightness signal.

The exposure of the first type and the exposure of the second type may have same exposure duration or different exposure durations. When exposure duration of the exposure of the first type is different from that of the exposure of the second type, the exposure duration of the exposure of the first type may be less than the exposure duration of the exposure of the second type. Of course, the exposure duration of the exposure of the first type may be greater than the exposure duration of the exposure of the second type. Specifically, for details of the process of analyzing the image signal generated by using the exposure of the first type to obtain the RGB color signals, one may refer to the process of obtaining the RGB color signals above, and for details of the process of analyzing the image signal generated by using the exposure of the second type to obtain the brightness signal, one may refer to the process of obtaining the brightness signal above, which will not be repeated herein.

It should be emphasized that, in order to ensure sufficient infrared signals, the image signal generated with a short exposure may be used to obtain the RGB color signals, and an image signal generated with a long exposure may be used to obtain the brightness signal, to improve the quality of the image. At this point, the exposure duration of the exposure of the first type is less than the exposure duration of the exposure of the second type.

In the embodiments of the present application, the multi-spectrum based image fusion apparatus having five types of photosensitive channels acquires target light corresponding to incident light, converts the target light into an image signal through the RGB channels, the IR channel and the W channel, analyzes the image signal into RGB color signals and a brightness signal, fuses the RGB color signals and the brightness signal to obtain a fused image. The collection of the channels based on which the RGB color signals and the brightness signal are obtained includes the five types of photosensitive channels. It can be seen that the present solution achieves the objective of acquiring a dual-band image through a multi-spectrum based image fusion apparatus having a simple structure.

In addition, image sensors are important components of a digital camera, and are high-end technical components used in photography. The commonly used image sensor is an image sensor based on Bayer pattern, which only has three channels, i.e., RGB channels, and can acquire only a few spectrum bands. Thus, the quality of images acquired by the image sensor cannot meet high quality requirements of users.

Therefore, an embodiment of the present application further provides an image sensor to acquire rich spectral bands, and to thereby improve the quality of images acquired by the image sensor. The so-called improvement of the quality of images is mainly means: more information of details, improved image clarity, improved image signal-to-noise ratio, and the like. In addition, the multi-spectrum based image fusion apparatus provided by the embodiments of the present application can use the image sensor provided by the embodiment of the present application, such that the quality of the fused image can be further improved.

Specifically, the image sensor provided by an embodiment of the present application has five types of photosensitive channels. The five types of photosensitive channels include red, green and blue RGB channels, an infrared IR channel and a full-band W channel. The proportion of pixels corresponding to the W channel is greater than the proportion of pixels corresponding to any other photosensitive channels.

The RGB channels can be photosensitive to both visible light band and infrared band, and are primarily used to acquire visible light. The IR channel is a channel photosensitive to the infrared band. The W channel is a channel photosensitive to all bands, in other words, the W channel can acquire visible light and infrared light.

Optionally, in a specific implementation, under the premise that the proportion of pixels corresponding to the W channel is greater than the proportion of pixels corresponding to any other channels, the proportion of pixels corresponding to each photosensitive channel of the RGB channels and the IR channel is the same. Moreover, for any sets of proportions of pixels, there may be various arrangements for the array of the image sensor, which will not be limited herein. For example, when the proportion of pixels corresponding to the W channel is $1/3$, the proportion of pixels corresponding to each photosensitive channel of the RGB channels and the IR channel can be $1/6$. For another example, when the proportion of pixels corresponding to the W channel is $2/5$, the proportion of pixels corresponding to each photosensitive channel of the RGB channels and the IR channel may be $3/20$.

Optionally, in a specific implementation, under the premise that the proportion of pixels corresponding to the W channel is greater than the proportion of pixels corresponding to any other channel, the proportion of pixels corresponding to at least one photosensitive channel of the RGB channels and the IR channel can be different from the proportion of pixels corresponding to the other photosensitive channels. In other words, three photosensitive channels of the four photosensitive channels may have a same proportion of pixels, and the proportion of the pixels corresponding to the other photosensitive channel is different from this same proportion of pixels corresponding to those three photosensitive channels. Alternatively, two photosensitive channels may correspond to a same proportion of pixels, and the proportions of pixels corresponding to the other two photosensitive channels are different from this same proportion of pixels, wherein the proportion of pixels corresponding to the other two photosensitive channels may be the same or different. Alternatively, the proportions of pixels of the four photosensitive channels are all different. In addition, it should be emphasized that there are various structures of the array for the image sensor depending on the sets of proportions of pixels, which is not limited herein. Further, in actual applications, under the premise that the proportion of pixels corresponding to the W channel is greater than the proportion of pixels corresponding to any other photosensitive channel, the proportion of pixels corresponding to each photosensitive channel of the RGB channels may be the same, while the IR channel has a proportion of pixels different from the proportion of pixels corresponding to the RGB channels, which is of course not limited thereto.

Optionally, in a specific implementation, for a further improved signal-to-noise ratio and more information of details of the acquired image, under the premise that the proportion of pixels corresponding to the W channel is greater than the proportion of pixels corresponding to any other photosensitive channel, the proportion of pixels corresponding to the W channel can be $1/2$. Moreover, when the proportion of pixels corresponding to the W channel is $1/2$, the proportion of pixels corresponding to each photosensitive channel of the RGB channels and the IR channel may be the same, that is, the proportion of pixels corresponding to each photosensitive channel is $1/8$. Of course, when the proportion of pixels corresponding to the W channel is $1/2$, the proportion of pixels corresponding to at least one of the RGB channels and IR channel may be different from the proportion of pixels corresponding to any other photosensitive channel. In addition, it should be emphasized that there are various structures of the array of the image sensor for any set of proportions of pixels, which is not limited herein.

It can be appreciated that when the proportion of pixels corresponding to the W channel is ½ and the proportion of pixels corresponding to any other photosensitive channels is ⅛, there may also be various structures for the array of the image sensor. For example, the pixels of the photosensitive channels are arranged as a uniform mesh as shown in FIG. 3, which is of course not limited thereto.

It should be emphasized that the structure of the array shown in FIG. 3 is only an exemplary structure of the array of the image sensor provided by an embodiment of the present application. In addition, the resolution of the image signal generated by the image sensor provided by the embodiment of the present application is related to the structure of the array, and the resolution of 8*8 shown in FIG. 3 is only the resolution corresponding to the image sensor having the structure of the array shown in FIG. 3, and should not be construed as limiting the embodiments of the present application.

In addition, those skilled in the art can appreciated that the embodiment of the image sensor provided herein can use any existing techniques in the related art to convert light into an image signal through the RGB channels, the IR channel, and the W channel, which is not limited herein.

The image sensor provided by the embodiments of the present application can acquire five types of spectral bands, and the W channel having a higher sensitivity corresponds to a larger proportion of pixels, such that more spectral bands are acquired, thereby improving the quality of the image acquired by the image sensor. The image quality of the fused image can be further improved if the image sensor provided by the embodiments of the present application is applied to the multi-spectrum based image fusion apparatus provided by the embodiments of the present application.

Corresponding to the multi-spectrum based image fusion method, an embodiment of the present application further provides a storage medium for storing executable codes. The executable codes, when executed, perform the steps of the multi-spectrum based image fusion method provided by any embodiments herein.

The executable codes stored in the storage medium provided by the embodiment of the present application can be executed by a multi-spectrum based image fusion apparatus provided by any one of the first aspects to: acquire target light corresponding to incident light; convert the target light to an image signal through the RGB channels, IR channel and W channel; analyze the image signal into RGB color signals and a brightness signal and fuse the RGB color signals and the brightness signal to obtain a fused image. The collection of the channels based on which the RGB color signals and the brightness signal are obtained includes the five types of photosensitive channels. In this way, the objective of acquiring a dual-band image through an apparatus with a simple structure is achieved.

Corresponding to the multi-spectrum based image fusion method, an embodiment of the present application further provides an application program. The application program, when executed, performs the steps of a multi-spectrum based image fusion method provided by any of the embodiments of the present application.

The application program provided by the embodiment of the present application can be executed by the multi-spectrum based image fusion apparatus provided by any one of the first aspects to: acquire target light corresponding to incident light; convert the target light to an image signal through the RGB channels, IR channel and W channel; analyze the image signal into RGB color signals and a brightness signal and fuse the RGB color signals and the brightness signal to obtain a fused image. The collection of the channels based on which the RGB color signals and the brightness signal are obtained includes the five types of photosensitive channels. In this way, the objective of acquiring a dual-band image through an apparatus with a simple structure is achieved.

It should be noted that, the relationship terms such as "first," "second" and the like herein are only used to distinguish one entity or operation from another entity or operation, and do not necessarily require or imply that there is any actual relationship or order between those entities or operations. Moreover, the terms "include", "comprise" or any variants thereof are intended to cover a non-exclusive inclusion, such that processes, methods, objects or devices comprising a series of elements include not only those elements, but also other elements not specified or the elements inherent to those processes, methods, objects, or devices. Without further limitations, an element limited by the phrase "comprise(s) a/an . . . " do not exclude that there are other identical elements in the processes, methods, objects, or devices that comprise that element.

The various embodiments herein are described in a related manner, and the same or similar parts of the embodiments may be referred to each other, and the description for each embodiment focuses on the a part different from that of the other embodiments. In particular, the apparatus/device embodiments are basically similar to the method embodiments, the description for the former is relatively simple, and the relevant parts can be referred to the description of the method embodiment.

The above description is only for preferred embodiments, and is not intended to limit the protection scope of the present application. Any modifications, equivalent substitutions, improvements, and the like made within the spirit and principle of the present application fall within the protection scope of the present application.

The invention claimed is:

1. A multi-spectrum based image fusion apparatus, comprising:
a light acquisition device, an image processor, and an image sensor having five types of photosensitive channels, the five types of photosensitive channels comprising red, green and blue RGB channels, an infrared IR channel and a full-band W channel; wherein
the light acquisition device is configured to acquire target light corresponding to incident light; wherein the light acquisition device is further configured to filter a spectrum component of a first predetermined wavelength range from the incident light to obtain the target light; wherein the first predetermined wavelength range is a spectrum wavelength range in which a difference between responsivities of the RGB channels and of a brightness channel of the image sensor at an infrared band is greater than a first predetermined threshold, the brightness channels being the IR channel or W channel; wherein the first predetermined wavelength range is [T1, T2], wherein the value of T1 is in a range of [600 nm, 800 nm], and the value of T2 is in a range of [750 nm, 1100 nm]; and
wherein the light acquisition device comprises a band-stop filter and an optical lens of a first type; wherein the optical lens of the first type is configured to transmit the incident light to the band-stop filter in a full spectrum transmission manner; and the band-stop filter is configured to filter the spectrum component of the first predetermined wavelength range from the light transmitted from the optical lens of the first type to obtain the target light, or the light acquisition device comprises an optical lens of a second type, which is capable of filtering the spectrum component of the first predetermined wavelength range;

the image sensor is configured to convert the target light into an image signal through the RGB channels, the IR channel and the W channel; and wherein during the conversion from the target light to the image signal by the image sensor, in a second predetermined wavelength range of the infrared band, differences between responsivities of the RGB channels are lower than a second predetermined threshold; wherein the second predetermined wavelength range is [T3, T4], wherein T4 is greater than T3, T3 is greater than or equal to 750 nm, and T4 is less than or equal to 1100 nm;

the image processor is configured to analyze the image signal into RGB color signals and a brightness signal, and fuse the RGB color signals and the brightness signal to obtain a fused image, wherein a collection of the channels based on which the RGB color signals and the brightness signal are obtained comprises the five types of photosensitive channels.

2. The multi-spectrum based image fusion apparatus of claim 1, wherein the process that the image processor analyzes the image signal into the RGB color signals and the brightness signal comprises:

performing an interpolation operation on the W channel of the image signal to generate a brightness signal that has a resolution same as an input resolution, wherein the input resolution is a resolution of the image signal;

performing interpolation operations on the RGB channels and IR channel of the image signal to generate an image signal of each of the channels that has a resolution same as the input resolution; and traversing the image signal of each of the channels, and subtracting a value of an IR parameter for a pixel position respectively from values of the traversed R channel, G channel, and B channel to generate the RGB color signals, wherein the value of the IR parameter is a product of a value of the IR channel at the pixel position and a preset correction value, or wherein the process that the image processor analyzes the image signal into the RGB color signals and the brightness signal comprises:

performing interpolation operations on the RGB channels, the IR channel and the W channel of the image signal to generate an image signal of each of the channels that has a resolution same as an input resolution;

generating the brightness signal by using the image signal of each of the channels, a first predetermined formula and a second predetermined formula; wherein the first predetermined formula is y=x1*R+x2*G+x3*B, and x1, x2, and x3 are weights, and wherein the second predetermined formula is the brightness signal=x4*W+x5*IR+x6*y, and x4, x5, and x6 are weights;

traversing the image signal of each of the channels, and subtracting a value of an IR parameter for a pixel position respectively from values of the traversed R channel, G channel, and B channel to generate first standby RGB color signals, wherein the value of the IR parameter is a product of a value of the IR channel at the pixel position and a preset correction value;

traversing the image signal of each of the channels, and subtracting a value of an IR' for a pixel position respectively from values of the traversed R channel, G channel, and B channel to generate second standby RGB color signals, wherein the value of the IR' for the pixel position is obtained by a third predetermined formula as IR'=(R+G+B−W)/n; and weighting and combining the first standby RGB color signals and the second standby RGB color signals to generate the RGB color signals.

3. The multi-spectrum based image fusion apparatus of claim 1, wherein the process that the image processor fuses the RGB color signals and the brightness signal to obtain the fused image comprises:

converting the RGB color signals into YUV signals, wherein the YUV signals are luminance and chrominance signals;

extracting chrominance UV components in the YUV signals;

combining the UV components with the brightness signal to form new YUV signals; and determining the new YUV signals as the fused image, or converting the new YUV signals into RGB signals and determining the resulting RGB signals as the fused image, or wherein the process that the image processor fuses the RGB color signals and the brightness signal to obtain the fused image comprises:

calculating an auxiliary value Y for each pixel according to the RGB color signals, as Y=(R*w1+B*w2+G*w3)/(w1+w2+w3), wherein R is a value of the R channel corresponding to the pixel, G is a value of the G channel corresponding to the pixel, B is a value of the B channel corresponding to the pixel, and w1, w2 and w3 are weights;

calculating a ratio of the value of each channel of the RGB color signals to the auxiliary value Y to obtain reference channel values K1, K2, and K3 for the pixel, which are calculated as K1=R/Y, K2=G/Y, K3=B/Y;

performing chroma noise reduction on the reference channel values K1, K2, and K3; and fusing the brightness signal Y' with the reference channel values K1-K3 subjected to the chroma noise reduction at the pixel, to generate fused RGB channel values R', G' and B' and obtain the fused image; which are calculated as R'=K1*Y'; G'=K2*Y '; and B'=K3*Y'.

4. The multi-spectrum based image fusion apparatus of claim 1, wherein during the conversion from the target light into the image signal, the image sensor performs a multiple-exposures acquisition within one frame time.

5. The multi-spectrum based image fusion apparatus of claim 4, wherein the process that the image processor analyzes the image signal into the RGB color signals and the brightness signal comprises:

analyzing an image signal generated by using an exposure of a first type to obtain the RGB color signals; and analyzing an image signal generated by using an exposure of a second type to obtain the brightness signal.

6. The multi-spectrum based image fusion apparatus of claim 5, wherein an exposure duration of the exposure of the first type is less than that of the exposure of the second type.

7. The multi-spectrum based image fusion apparatus of claim 1, further comprising a signal controller, configured to control the image sensor to generate an image signal that meets a predetermined brightness requirement.

8. The multi-spectrum based image fusion apparatus of claim 7, wherein the signal controller is further configured to analyze brightness of image signals generated by the image sensor, and control the image sensor according to an analyzing result to generate the image signal that meets the predetermined brightness requirement,
or
the signal controller is further configured to control the image sensor to switch between one-exposure acquisition and multiple-exposures acquisition.

9. The multi-spectrum based image fusion apparatus of claim 7, further comprising an infrared light filling device; wherein the signal controller is further configured to control the infrared light filling device to fill infrared light for the image sensor.

10. A multi-spectrum based image fusion method, applicable to a multi-spectrum based image fusion apparatus having five types of photosensitive channels, wherein the five types of photosensitive channels comprises red, green and blue RGB channels, an infrared IR channel and a full-band W channel; the method comprising:
acquiring target light corresponding to incident light, comprising filtering a spectrum component of a first predetermined wavelength range from the incident light to obtain the target light; wherein the first predetermined wavelength range is a spectrum wavelength range in which a difference between responsivities of the RGB channels and of a brightness channel of an image sensor at an infrared band is greater than a first predetermined threshold, the brightness channel being the IR channel or W channel, and wherein the first predetermined wavelength range is [T1, T2], wherein the value of T1 is in a range of [600 nm, 800 nm], and the value of T2 is in a range of [750 nm, 1100 nm];
converting the target light into an image signal through the RGB channels, the IR channel and the W channel;
wherein during the conversion from the target light into the image signal, in a second predetermined wavelength range of the infrared band, differences between responsivities of the RGB channels are lower than a second predetermined threshold, wherein the second predetermined wavelength range is [T3, T4], wherein T4 is greater than T3, T3 is greater than or equal to 750 nm, and T4 is less than or equal to 1100 nm; and
analyzing the image signal into RGB color signals and a brightness signal, and fusing the RGB color signals and the brightness signal to obtain a fused image, wherein the collection of the channels based on which the RGB color signals and the brightness signal are obtained comprises the five types of photosensitive channels.

11. The method of claim 10, wherein the step of analyzing the image signal into the RGB color signals and the brightness signal comprises:
performing an interpolation operation on the W channel of the image signal to generate a brightness signal that has a resolution same as an input resolution, wherein the input resolution is a resolution of the image signal;
performing interpolation operations on the RGB channels and IR channel of the image signal to generate an image signal of each of the channels that has a resolution same as the input resolution; and
traversing the image signal of each of the channels, and subtracting a value of an IR parameter for a pixel position respectively from values of the traversed R channel, G channel, or B channel to generate the RGB color signals, wherein the value of the IR parameter is a product of a value of the IR channel at the pixel position and a preset correction value,
or
wherein the step of analyzing the image signal into the RGB color signals and the brightness signal comprises:
performing interpolation operations on the RGB channels, the IR channel and the W channel of the image signal to generate an image signal of each of the channels that has a resolution same as an input resolution;
generating the brightness signal by using the image signal of each of the channels, a first predetermined formula and a second predetermined formula; wherein the first predetermined formula is $y=x1*R+x2*G+x3*B$, and x1, x2, and x3 are weights, and wherein the second predetermined formula is the brightness signal$=x4*W+x5*IR+x6*y$, and x4, x5, and x6 are weights;
traversing the image signal of each of the channels, and subtracting a value of an IR parameter for a pixel position respectively from values of the traversed R channel, G channel, and B channel to generate first standby RGB color signals, where the value of the IR parameter is a product of a value of the IR channel at the pixel position and a preset correction value;
traversing the image signal of each of the channels, and subtracting a value of an IR+ for a pixel position respectively from values of the traversed R channel, G channel, and B channel to generate second standby RGB color signals, where a value of IR' for the pixel position is obtained by a third predetermined formula as $IR'=(R+G+B-W)/n$; and
weighting and combining the first standby RGB color signals and the second standby RGB color signals to generate the RGB color signals,
or
wherein the step of fusing the RGB color signals and the brightness signal to obtain the fused image comprises:
converting the RGB color signals into YUV signals, wherein the YUV signals are luminance and chrominance signals;
extracting chrominance UV components in the YUV signals;
combining the UV components with the brightness signal to form new YUV signals; and
determining the new YUV signals as the fused image, or converting the new YUV signals into RGB signals and determining the resulting RGB signals as the fused image, or
wherein the step of fusing the RGB color signals and the brightness signal to obtain a fused image comprises:
calculating an auxiliary value Y for each pixel according to the RGB color signals, as $Y=(R*w1+B*w2+G*w3)/(w1+w2+w3)$, wherein R is a value of the R channel corresponding to the pixel, G is a value of the G channel corresponding to the pixel, B is a value of the B channel corresponding to the pixel, and w1, w2 and w3 are weights;
calculating a ratio of the value of each channel of the RGB color signals to the auxiliary value Y to obtain reference channel values K1, K2, and K3 for each pixel, which are calculated as $K1=R/Y$, $K2=G/Y$, $K3=B/Y$;

performing chroma noise reduction on the reference channel values K1, K2, and K3; and fusing the brightness signal Y' with the reference channel values K1-K3 subjected to the chroma noise reduction at the pixel, to generate fused RGB channel values R', G' and B' and to obtain the fused image; wherein R', G' and B' are calculated as R'=K1*Y'; G'=K2*Y'; and B'=K3*Y'.

12. A non-transitory storage medium for storing executable codes that, when executed, perform the multi-spectrum based image fusion method of claim 10.

13. An image sensor, having five types of photosensitive channels, wherein the five types of photosensitive channels comprises red, green and blue RGB channels, an infrared IR channel and a full-band W channel, a proportion of pixels corresponding to the W channel is greater than a proportion of pixels corresponding to any other photosensitive channels;

the image sensor is configured to convert the target light into an image signal through the RGB channels, the IR channel and the W channel; and wherein during the conversion from the target light to the image signal by the image sensor, in a second predetermined wavelength range of the infrared band, differences between responsivities of the RGB channels are lower than a second predetermined threshold; wherein the second predetermined wavelength range is [T3, T4], wherein T4 is greater than T3, T3 is greater than or equal to 750 nm, and T4 is less than or equal to 1100 nm;

the image processor is configured to analyze the image signal into RGB color signals and a brightness signal, and fuse the RGB color signals and the brightness signal to obtain a fused image, wherein a collection of the channels based on which the RGB color signals and the brightness signal are obtained comprises the five types of photosensitive channels.

14. The image sensor of claim 13, wherein the proportion of pixels corresponding to the W channel is ½, and wherein the proportion pixels corresponding to each photosensitive channel of the RGB channels and the IR channel is the same, or the proportion of pixels corresponding to at least one photosensitive channel of the RGB channels and the IR channel is different from the proportions of pixels corresponding to the other photosensitive channels.

15. The image sensor of claim 14, wherein the proportion of pixels corresponding to each photosensitive channel of the RGB channels is the same, and wherein when the proportion of pixels corresponding to the W channel is ½, pixels corresponding to each of the five types of photosensitive channels are arranged as a uniform mesh.

* * * * *

UNITED STATES PATENT AND TRADEMARK OFFICE
CERTIFICATE OF CORRECTION

| | | |
|---|---|---|
| PATENT NO. | : 11,526,969 B2 | |
| APPLICATION NO. | : 16/480270 | |
| DATED | : December 13, 2022 | |
| INVENTOR(S) | : Meng Fan, Hai Yu and Shiliang Pu | |

It is certified that error appears in the above-identified patent and that said Letters Patent is hereby corrected as shown below:

On the Title Page

Item (73), Assignee's name should read "HANGZHOU HIKVISION DIGITAL TECHNOLOGY CO., LTD."

In the Claims

Claim 11, Column 26, Line 31 should read "value of an IR' for a pixel".

Signed and Sealed this
Eleventh Day of April, 2023

Katherine Kelly Vidal
*Director of the United States Patent and Trademark Office*